June 25, 1940.　　　　W. R. FRANK　　　　2,205,403
STEERING MECHANISM FOR AGRICULTURAL IMPLEMENTS
Filed April 24, 1939　　　2 Sheets-Sheet 1

Inventor
WILLIAM R. FRANK
By Carlsen + Hazle
Attorneys

June 25, 1940.  W. R. FRANK  2,205,403
STEERING MECHANISM FOR AGRICULTURAL IMPLEMENTS
Filed April 24, 1939   2 Sheets-Sheet 2

Inventor
WILLIAM R. FRANK
By Carlsen & Hazle
Attorneys

Patented June 25, 1940

2,205,403

UNITED STATES PATENT OFFICE 2,205,403

STEERING MECHANISM FOR AGRICULTURAL IMPLEMENTS

William R. Frank, Moline, Ill., assignor to Minneapolis-Moline Power Implement Company, Minneapolis, Minn., a corporation of Delaware Application April 24, 1939, Serial No. 269,698

12 Claims. (Cl. 97—181)

This invention relates to improvements in agricultural implements, and more specifically to steering mechanisms therefor.

The invention has particular reference to that type of relatively large and heavy disk plow which is commonly called a wheatland or tiller plow. Such implements comprise essentially a disk gang on a three-wheeled frame and adapted to be drawn at an oblique angle across the field to till the soil thereof and work it into shape for immediate seeding. In fact some types of such plows include also seeding attachments for seeding the field as it is worked. The three wheels mentioned comprise a forward furrow wheel at the leading end of the disk gang to run in the previously completed furrow, a rear furrow wheel at the trailing end of the gang, and a forwardly located land wheel to run on the unworked soil head of the gang. It is very important that the furrow wheels run at the proper angle to hold the plow to its work and also, since these wheels are widely and irregularly spaced (with respect to the line of travel) they must be angled properly to guide the plow in making a turn. Hitherto the steering operation has been carried out by connection with the draft hitch and by a connection between the two furrow wheels.

The foregoing briefly described construction is eminently satisfactory for tractor use but these plows are often desirable for use as horse drawn implements, and the usual steering mechanism will obviously be unsatisfactory under such circumstances. It is the primary object of my invention, therefore, to provide a steering and wheel controlling mechanism particularly suitable for horse drawn implements of this or similar kinds which require the angling of two or more transversely spaced and obliquely located wheels for steering, and in which manual control and adjustment by the operator riding the implement is made convenient and practical.

Another object is to provide steering mechanism of this kind in which both front and rear furrow wheels are positively angled and controlled and with at all times the proper relative range or amplitude of movement of the wheels to steer the plow in proper course whether the turn is being made to the right or the left.

A further object is to provide a self-contained and self-supported steering and control mechanism of this kind in which differentially operating connections are employed in order that a minimum displacement of the operating lever will be required to effect the maximum of steering affect on the respective wheels, and which requires no support on the implement other than its connection to the steered posts.

These and other more detailed and specific objects will be disclosed in the course of the following specification, reference being had to the accompanying drawings, in which—

Figure 1:
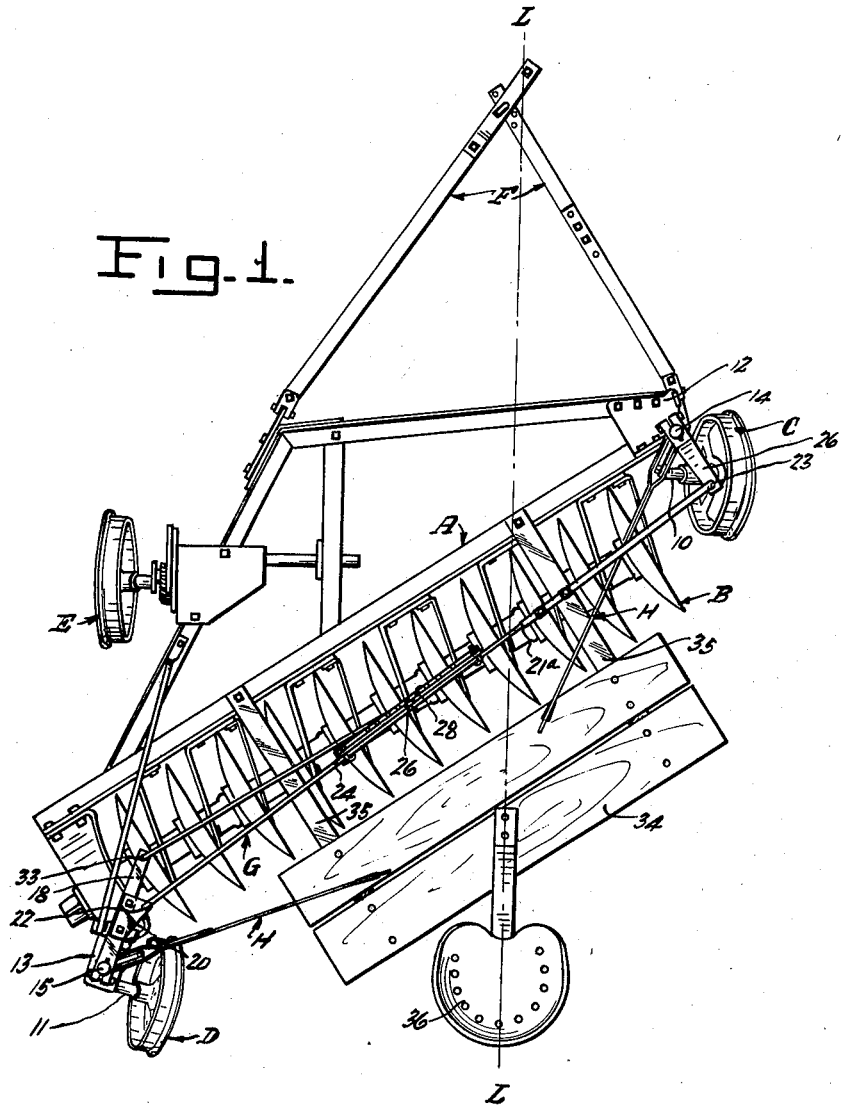
Fig. 1 is a plan view of an implement embodying the invention.
Figure 2:
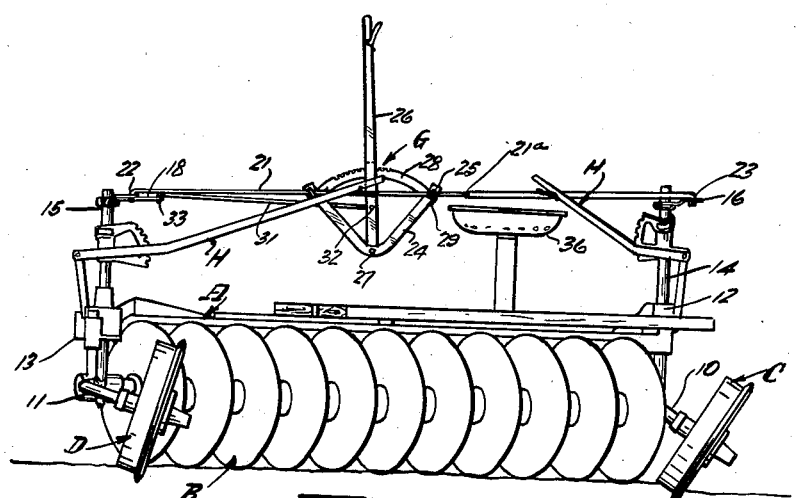
Fig. 2 is a rear view.
Figure 3:
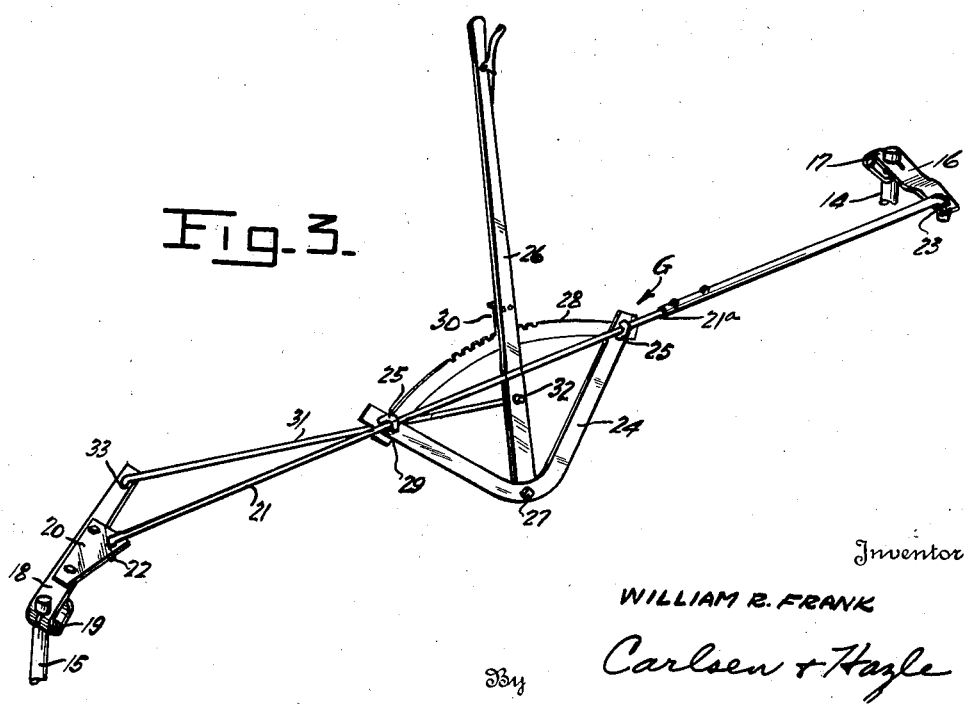
Fig. 3 is an enlarged perspective view of the steering mechanism alone.

The drawings illustrate, by way of example, a well known type of disk plow with such changes as are necessary to adapt it for horsedrawn work embodied in the assembly, and with the present invention shown in use in connection with the steering and control of the furrow wheels. It is to be understood, however, that the particular novel steering mchanism disclosed herein may be used as well with other implements where such use would be practicable.

Referring now more particularly and by reference characters to the drawings, A designates the plow frame, B the disk gang, C the front furrow wheel, D the rear furrow wheel, E the land wheel, and F the draft attachments or draft frame. The disk gang and main frame elements are disposed obliquely with respect to the line of forward travel, indicated at L—L, whereas the various wheels operate substantially parallel with this line although tilting from the vertical as shown. The front furrow wheel C operates forwardly and outwardly of the leading end of the disk gang, the rear furrow wheel D operates behind the trailing end of the gang, and the land wheel E runs ahead of this rear furrow wheel over the unworked ground immediately ahead of the disk gang. This is the conventional arrangement of these elements and it will be readily evident that the respective positions, particularly of the furrow wheels, are important in order that these wheels will properly carry the implement and resist the relatively enormous side draft of the obliquely operating disk gang.

Also due to the wide spacing between the furrow wheels and their oblique positions with respect to the line of travel, it will be obvious that control of their angle will be a distinct necessity when the implement is turned to either right or left. For this reason the furrow wheels C and D are conventionally carried by axles 10 and 11, respectively, and which include upright portions swiveled in heavy bearing members 12 and 13 secured to frame A. These upright portions of the axles, hereinafter termed the steering posts, are designated 14 and 15 for the respective wheels C and D, permit the oscillation of the wheels about vertical axes and upon the offset lower axle ends to thus angle the wheels with respect to the frame and disk gang. Ordinarily the steering posts are adjusted about their upright axes by a connection between the posts and another connection between the forward posts and the tractor draw bar or draft assembly so that steering adjustments will be automatically carried out as the tractor is steered toward either side.

In accordance with my invention these connections are eliminated and in lieu thereof my steering and control mechanism, designated generally at G, is employed. The steering post 14 of the forward furrow wheel C is provided with a short steering arm 16 secured or clamped at 17 to its upper portion and extended radially, and in a generally rearward direction therefrom. The steering post 15 of the rear furrow wheel D is provided with a similar but longer steering arm 18 clamped at 19 to its upper portion and likewise extended radially but substantially forwardly therefrom. A mounting plate, or extension member 20 is provided in the rear steering arm 18 and a connecting rod or tie member 21 is extended between this plate 20 and the forward steering arm 16, being pivotally connected at its ends 22—23 to these parts.

Intermediate its ends the connecting rod 21 carries a hand lever mounting yoke or bracket 24 which is of wide arcuate V-shape secured by U-bolts 25, or otherwise, at its upper ends to the rod and depended in a substantially vertical plane therefrom. To the lower bight portion of this bracket 24 a hand or steering lever 26 is pivotally attached at 27 so that it may extend upwardly and forwardly of the connecting rod and play over a notched quadrant bar 28 which is secured at its ends at 29 to said bracket. The lever carries the usual hand releasable pawl or dog assembly 30 by which it may be locked in any adjusted position with respect to the quadrant 28.

An operating rod or differentially operating connection 31 is pivotally connected at its ends 32—33 to the lever 26 and to the extended end of the rear steering arm 18, and this rod runs forwardly of the rod 21 as shown.

It will be noted that the length of the rod 21 is adjustable by a telescopically arranged joint at 21a, or by any other suitable means, and such adjustment allows the relative running angle of the furrow wheels C and L to be adjusted, for proper operation of the plow, and without interfering with the steering of the wheels.

A platform 34 is supported rearwardly of the disk gang B by suitable brackets 35 and a riding seat 36 is carried by this platform. The lever 26 is located conveniently over and forwardly of the platform so that the operator standing thereon may readily adjust the same as required. The conventional adjusting levers H for raising and lowering the steering posts 14 and 15 with respect to the frame may be employed, but they are desirably turned from their usual forward direction (used for convenience of adjustment from the tractor seat) to a position convenient to a hand of an operator on the seat 36 as clearly shown. Any additional controls such as the lift for the land wheel E may also be brought back near the operator's seat. The hitch frame F is adjusted for proper draft in the horsedrawn application of the implement, and all these minor changes, necessary to adapt the tractor plow to its new use, are readily made, as will be evident.

In operation the wheels run in substantially the position shown, while the plow is moving straight ahead and such minor adjustments as necessary to cause the plow to run properly may, as hereinbefore stated, be made by adjustment of the length of the rod 21. The extension member 20, if a separate piece, might also be adjustable for this purpose. When a turn is made in either direction, however, the furrow wheels C and D must be angled properly to track and turn freely without causing side slippage or strains on the frame, and it is for this purpose that my steering mechanism G is provided. It is thought that the peculiar and novel operation of the mechanism will be made more clearly understandable by the following brief description of the particular action required.

Thus, in making a turn to the left, the entire plow turns on a radius substantially centered about the land wheel E and the furrow wheels C and D, due to their oblique relation, for proper operation should at this time be adjusted to a position at which their axes substantially coincide with radial planes extended from said land wheel. This may be accomplished, but the required amplitude or range of adjustment of the front furrow wheel C to bring about this action is considerably less than that required to bring the rear furrow wheel D to a corresponding position and a differential action is thus required.

A turn to the opposite, or right hand, direction requires adjustment of the wheels toward the opposite side, but in this case the wheels are more properly aligned with the direction of travel and less adjustment is actually required. The rear furrow wheel D and land wheel E will, in making this turn, follow substantially the same arcuate path about an imaginary center located over to the right of the plow, or away from the land.

To make the required adjustment of the wheels for a turn to the left the hand lever 26, which normally or during straightahead travel stands substantially upright, is released from the quadrant 28 and moved toward the right. The pull thus exerted on the rod 31 pulls the forwardly extended, rear steering arm 18 toward the right, and by a corresponding endwise shifting of the rod 21 urges the rearwardly extended, forward steering arm 16 to the right also. This action shifts the forward furrow wheel forwardly and angles it to the left in the direction of the turn while the rear furrow wheel is simultaneously swung rearwardly and angled outwardly at the leading side toward the outside of the turn. The respective centers 22 and 23 are so located, and the relative angles of the steering arms 16 and 18 are such that the range of movement of the rear furrow wheel is substantially greater than that of the forward furrow wheel in order to move the wheels to the proper relative positions, and so that the wheels are actually adjusted in opposite directions as will be apparent.

For a turn to the right the hand lever 26 is moved in the opposite direction or toward the left, and the furrow wheels are adjusted in the required manner by the shifting of the tie member 21.

The offset relation of the pivot 22 with respect to the pivot 33 allows the arm 18 to be adjusted (to the right) substantially to a point in alignment with the tie member 21 without interference between this member and the operating rod 31.

The mounting and support of the hand lever 26 directly upon the tie member 21 forms a self-supporting and compact assembly which requires no support other than its connection to the actual steered or adjusted elements. Due also to the leverage employed between the lever and the rear steering arm 18 through the operating rod 31 the lever requires far less range of adjustment to bring about the desired steering action than would be the case were the lever pivoted to some fixed part of the machine and connected to the tie rod 21. Added also to the inconvenience and expense of such an arrangement, as contrasted to any self-supported assembly, would be the requirement of some sort of a supporting bracket or stand for the lever, especially since the steering posts are necessarily located at some height above the implement and the platform thereon.

From the foregoing it will be apparent that I have provided a simple, effective, and convenient steering mechanism for such implements as the disk plow shown, and have provided for the effective use and control of the implement when drawn by tractive power other than the tractor. It is understood that my invention may be used as well, with minor modification, if necessary, upon other implements wherein similar steering conditions are encountered.

Having now therefore fully illustrated and described my invention, what I claim to be new and desire to protect by Letters Patent is:

1. The combination with an implement including steerable wheels and steering members for the wheels, of means for adjusting the steering members comprising steering arms secured to the steering members, a tie member connected between the steering arms, and normally operable means carried by the tie member and connected with one steering arm for shifting said tie member endwise and effecting oscillatory adjustment of the said arms.

2. The combination with an implement including steerable supporting wheels and steering members for angling the wheels for steering purpose, of means for adjusting the steering members, comprising arms connected to the steering members, a tie member extended between the arms and pivotally connected at its ends thereto, a hand lever adjustably supported on the tie member, and means extended between the lever and one arm for shifting the tie member in an endwise direction and adjusting the position of the arms.

3. The combination with an implement including dirigible supporting wheels and steering mechanism including oscillatable arms for angling the wheels, of means for adjusting the arms and effecting steering movement of the wheels, comprising a tie member extending between the arms and pivotally connected at its ends thereto, and manually adjustable operating means carried by the tie member for shifting the same endwise and oscillating the arms.

4. The combination with an implement including dirigible supporting wheels and steering mechanism including oscillatable arms for angling the wheels, of means for adjusting the arms and effecting steering movement of the wheels, comprising a tie member extending between the arms and pivotally connected at its ends thereto, manually adjustable operating means carried by the tie member for shifting the same endwise and oscillating the arms, and means for adjusting the length of the tie member for varying the relative angle of the wheels relative to the direction of travel of the implement.

5. In combination with an implement including spaced supporting wheels and upright steering members connected to said wheels for angling the same about generally vertical axes, means for effecting such movement of the steering members and comprising, arms extended from the members, a tie member connected at its ends to the arms and shiftable lengthwise for oscillating the arms and rocking the steering members, a hand lever adjustably supported on the tie member, and an operating rod pivotally connected at its ends between one arm and the hand lever for adjusting said arm and the tie member in response to adjustment of the hand lever.

6. In combination with an implement including spaced supporting wheels and upright steering members connected to said wheels for angling the same about upright axes, means for effecting such movement of the steering members and comprising, arms extended from the members, a tie member extending between the arms and pivotally connected at its ends thereto, a hand lever pivotally supported on the tie member intermediate the ends thereof, and an operating member pivotally connected at one end to the hand lever for endwise movement thereby and pivotally connected at its other end to one of the arms at a point spaced outwardly beyond the pivotal connection between that arm and the tie member.

7. The combination with an implement including a pair of dirigible supporting wheels and axle members journaled about upright axes for angling the wheels, of means for oscillating said axle members on their axes to steer radially the wheels, comprising arms radially extending from the axle members, a tie member arranged for endwise shifting movement and pivotally connected at its ends to the arms to operate thereon at a predetermined leverage and effect oscillating movement thereof, a hand adjustable member supported by the tie member, and an operating rod adapted for endwise reciprocation by manipulation of said hand adjustable member and connected to one arm to operate with longer leverage thereon and thereby effect endwise shifting movement of said tie member.

8. The combination with an implement including horizontally spaced dirigible wheels and axle members including upright portions journaled for angling the wheels, of means for oscillating the said axles about upright axes, comprising arms secured to and extended from the upright portions of the axles, a tie member extending between the arms and connected at its ends thereto at pivot points spaced from said axles, a hand lever adjustably supported on the tie member intermediate its ends, a connecting rod pivotally connected at one end to said lever for endwise adjustment thereby, the other end of the said rod being pivotally connected to one of said arms at a point spaced outwardly with respect to the axle and the pivot point at which the tie member is connected to the arm, and the said pivot point of the tie member on the arm being offset with respect to a radial line passing through the axle and the pivot connection for the operating rod.

9. The combination with an implement having two dirigible wheels located at diagonally opposed front and rear portions of the implement and with upright, journaled, steering posts for angling the wheels, of means for adjusting said posts upon their axes for effecting steering movement of the wheels, comprising arms secured to and extended from the posts, a tie member extended diagonally between the posts and pivotally connected at its ends to outer portions of the arms, a control member supported on a central portion of the tie member, and an operating member connected at one end to the control member for adjustment thereby and connected at its other end to the arm on the rearwardly located post at a point spaced forwardly with respect to the connection of the tie member therewith.

10. The combination with an implement having two diagonally spaced dirigible wheels having journaled steering posts for angling the wheels, of means for adjusting said posts upon their axes for effecting steering movement of the wheels, comprising arms secured to and extended from the posts, the arm on the rear post being arranged for operation in a plane forwardly of the post and the arm on the forward post being arranged for operation in a plane rearwardly of the post, a tie member extended diagonally between the posts and pivotally connected at its ends to outer portions of the arms, a control member supported on a central portion of the tie member, and an operating member connected at one end to the control member for adjustment thereby and connected at its other end to the arm on the rearwardly located post at a point spaced outwardly and radially thereon with respect to the connection of the tie member therewith.

11. In an implement, a frame, a diagonally spaced front and rear dirigible wheels supporting the frame, upright axle members connected to the wheels and movable about upright axes for angling the wheels in opposite directions in a horizontal plane, arms secured to and extended from the axles, a tie member connecting the arms and arranged for endwise movement to thereby oscillate the said arms, a seat supported rearwardly of the said tie member, and means supported on the tie member forwardly of the seat and operatively arranged for shifting the said tie member in endwise directions.

12. In an implement, a frame, diagonally spaced front and rear dirigible wheels supporting the frame, vertically adjustable upright axle members connected to the wheels and movable about upright axes for angling the wheels in opposite directions in a horizontal plane, arms secured to and extended from the axles, a tie member connecting the arms and arranged for endwise movement to thereby oscillate the said arms, a seat supported rearwardly of the said tie member, means supported on the tie member forwardly of the seat and operatively arranged for shifting the said tie member in endwise directions, and means extended from each axle to points adjacent the seat for vertically adjusting the said axles.

WILLIAM R. FRANK.

CERTIFICATE OF CORRECTION.

Patent No. 2,205,403.                                              June 25, 1940.

WILLIAM R. FRANK.

It is hereby certified that error appears in the printed specification of the above numbered patent requiring correction as follows: Page 3, second column, lines 40 and 41, claim 7, strike out the word "radially"; page 4, second column, line 4, claim 11, strike out "a" second occurrence; and that the said Letters Patent should be read with this correction therein that the same may conform to the record of the case in the Patent Office.

Signed and sealed this 13th day of August, A. D. 1940.

Henry Van Arsdale, (Seal)                                                     Acting Commissioner of Patents.